US009772192B2

(12) United States Patent
Venkatraman et al.

(10) Patent No.: US 9,772,192 B2
(45) Date of Patent: *Sep. 26, 2017

(54) METHODS AND SYSTEMS FOR COLLABORATIVE NAVIGATION AND OPERATION WITH A MOBILE DEVICE AND A WEARABLE DEVICE

(71) Applicant: QUALCOMM Incorporated, San Diego, CA (US)

(72) Inventors: Sai Pradeep Venkatraman, Santa Clara, CA (US); Benjamin A. Werner, Sunnyvale, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,137

(22) Filed: Jul. 26, 2016

(65) Prior Publication Data

US 2016/0334220 A1   Nov. 17, 2016

Related U.S. Application Data

(63) Continuation of application No. 14/322,546, filed on Jul. 2, 2014, now Pat. No. 9,441,976.

(51) Int. Cl.
*G01C 21/20* (2006.01)
*G01C 21/36* (2006.01)
(Continued)

(52) U.S. Cl.
CPC ........... *G01C 21/20* (2013.01); *G01C 21/206* (2013.01); *G01C 21/3688* (2013.01);
(Continued)

(58) Field of Classification Search
CPC .. G01C 21/20; G01C 21/3688; G01C 21/206; G01S 3/02; G06F 3/01; H04W 4/008; H04W 4/023; H04W 4/043; H04W 76/02
See application file for complete search history.

(56) References Cited

U.S. PATENT DOCUMENTS 5,469,175 A   11/1995 Boman
5,506,587 A   4/1996 Lans
(Continued)

OTHER PUBLICATIONS

Hall, Chris, "Garmin announces Sony SmartWatch 2 integration, Xperia Edition navigation app," <http://www.pocket-lint.com/news/127455-garmin-announces-sony-smartwatch-2-integration-xperia-edition-navigation-app>, Feb. 23, 2014.
(Continued)

*Primary Examiner* — Richard Camby
(74) *Attorney, Agent, or Firm* — Blakely, Sokoloff, Taylor & Zafman; Thien T. Nguyen (57) ABSTRACT

Disclosed is an apparatus and method for collaborative navigation and operation on two mobile devices. The method may include establishing a wireless connection between a first mobile device and a second mobile device, and generating navigation data by the first mobile device for collaborative navigation based on a location of the first mobile device. The method may also include selecting a first subset of the navigation data for display by the first mobile device, and selecting a second subset of the navigation data for display by the second mobile device. The method may also include transferring the second subset of navigation data to the second mobile device and coordinating the display of the first subset of navigation data on the first mobile device with display of the second subset of navigation data on the second mobile device.

69 Claims, 6 Drawing Sheets

(51) Int. Cl.
*H04W 4/00* (2009.01)
*H04W 4/02* (2009.01)
*H04W 4/04* (2009.01)
*H04W 76/02* (2009.01)

(52) U.S. Cl.
CPC ........... *H04W 4/008* (2013.01); *H04W 4/023* (2013.01); *H04W 4/043* (2013.01); *H04W 76/02* (2013.01)

(56) References Cited

U.S. PATENT DOCUMENTS

| | | | |
|---|---|---|---|
| 6,816,782 | B1 | 11/2004 | Walters et al. |
| 8,897,805 | B2* | 11/2014 | Fix ........................ H04W 64/00 455/404.2 |
| 9,066,199 | B2* | 6/2015 | Forstall .................. H04W 4/02 |
| 9,441,976 | B2 | 9/2016 | Venkatraman et al. |
| 2013/0219285 | A1 | 8/2013 | Iwasaki |
| 2013/0335273 | A1 | 12/2013 | Pakzad et al. |

OTHER PUBLICATIONS

Jonnalagadda, Harish, "Asus smartwatch will feature gesture and voice guided navigation," Mar. 11, 2014.
Souppouris, Aaron, <http://www.theverge.com/2014/3/7/5477768/gabor-balogh-circular-smartwatch-concept>, Mar. 7, 2014.
Zibreg, Christian, "Concept Imagines iWatch Maps," <http://www.idownloadblog.com/2013/05/24/concept-imagines-iwatch-maps/>, May 24, 2013, 5 pages.
"New Concept Integrated with the Apple Maps—[Apple iWatch]", <http://www.evasi0njailbreakios.com/2013/05/new-concept-integrated-with-apple-maps.html>, May 2013, 3 pages.
Non-Final Office Action for U.S. Appl. No. 14/322,546, filed Jul. 2, 2014, dated Aug. 20, 2015; 7 pages.
Non-Final Office Action for U.S. Appl. No. 14/322,546, filed Jul. 2, 2014, dated Dec. 22, 2015; 8 pages.
Notice of Allowance for U.S. Appl. No. 14/322,546, filed Jul. 2, 2014, dated Apr. 15, 2016; 6 pages.
Notice of Allowance for U.S. Appl. No. 14/322,546, filed Jul. 2, 2014, dated Jun. 7, 2016; 5 pages.

* cited by examiner

METHODS AND SYSTEMS FOR COLLABORATIVE NAVIGATION AND OPERATION WITH A MOBILE DEVICE AND A WEARABLE DEVICE

CROSS REFERENCE TO RELATED APPLICATIONS

This application is a continuation of and claims priority to U.S. patent application Ser. No. 14/322,546, filed Jul. 2, 2014, which is assigned to the assignee hereof and which is incorporated by reference herein in its entirety.

FIELD

The subject matter disclosed herein relates generally to collaborative navigation and operation between different devices.

BACKGROUND

As users begin to integrate more technology into their lives, they often use several mobile devices, such as tablets, smartphones, etc., at the same time or in conjunction with one another. Users are also beginning to embrace additional types of mobile devices, such as smartwatches and other wearable computing devices. A wearable computing device, such as a smartwatch, may be paired with a mobile device to provide functionality beyond that generally associated with traditional watches. For example, a user may access email available on their mobile device from their smartwatch. However, there is a lack of integration or synergy between the pairing of a mobile device and wearable device for positioning and navigation purposes.

DETAILED DESCRIPTION

Methods and systems are disclosed herein for collaborative navigation on two mobile devices. In one embodiment, the mobile devices can include a mobile device and a wearable device. For example, the mobile device may be a mobile telephone, and the wearable device may be a smartwatch. However, the following description is applicable to any combination of mobile devices, such as two mobile telephones, a tablet and a mobile telephone, a tablet and a wearable device, etc. For ease of discussion, and not by way of limitation, the remaining description will be directed to a mobile device and a wearable device that are capable of establishing a wireless connection and exchanging data with one another over the wireless connection.

In one embodiment, the mobile device provides one or more navigation services to a user, such as displaying location based maps, generating location based directions, generating real-time navigation to a real world location, location-based search etc. Mobile device and the wearable device may then be paired with one another over a wireless connection, such as a Bluetooth network, Z-Wave network, ZigBee network, or other suitable personal area network connection. After the devices are paired, the mobile device and the wearable device perform one or more collaborative navigation operations, as discussed in greater detail below.

In one embodiment, the mobile device generates navigation data for a real-time navigation process. The navigation data generated by the mobile device may include real-time maps and turn-by-turn directions based on a position of the mobile device. In one embodiment, a subset of the navigation data may be provided to the wearable device for collaborative navigation display. In one embodiment, the mobile device transfers the coordinates or last turn to the wearable device over the local area connection. Furthermore, the navigation displayed by each device can include different navigation data for different purposes. For example, during collaborative navigation, the mobile device may display a complete point-to-point route for a user, while the wearable device displays a next turn, time to destination, current speed, or other navigation metric. As another example of collaborative navigation, the mobile device may display global positioning system (GPS) based navigation data, such as a GPS based map showing a geography of a region, while the wearable device displays access point based navigation data, such as a user's location on a map of an internal floor plan of a building.

In one embodiment, multiple display and notification options for the collaborative navigation operations may be available on the wearable device. In one embodiment, the wearable device and/or mobile device receive user specification of one or more navigation display modes. For example, the navigation modes selectable by a user may include displaying the same navigation data on both devices, on the wearable device only, on the mobile device only, etc. In one embodiment, a default set of display and navigation options are utilized by the mobile device and wearable device in the event that no options are selected by a user.

Additionally, the wearable device may generate one or more visual, auditory, or sensory notifications to a user based on the subset of navigation data, such as causing the wearable device to vibrate in response to an upcoming turn. Furthermore, a notification may be triggered on the wearable device by the mobile device that indicates input is needed by the user with regard to an ongoing navigation operation on the mobile device. The wearable device receives the user input, and transfers the user selections to the mobile device. The mobile device then utilizes the received user selections to adjust the navigation process at the mobile device. For example, during navigation, a user may enter a structure. A user may be prompted for input to select what floor they are on within the structure, whether the user desires to switch from GPS-based to access point-based navigation, etc. As another example, in response to a query for directions to a retail store that returns several results, user selection of the specific retail store can be received at the wearable device.

These selections may then be used by the mobile device as input to ongoing navigation operations.

In one embodiment, mobile device further generates wearable device configuration data based on navigation data, current location, or other location-based contextual data. In one embodiment, brightness, contrast, and volume settings on a wearable device may be controlled by the mobile device as a function of estimated location. In one embodiment, the wearable device is not a location aware device. In this embodiment, the mobile device infers a current location of the wearable device based on a collocation of the wearable device and the mobile device, and a determined location of the mobile device. For example, mobile device and wearable device may be involved in a collaborative navigation display process for a travel route that starts at a user's home and ends at a movie theatre. Based on the mobile device's determination that the mobile device is approaching the theatre entrance, and based on contextual knowledge that brightness, volume, etc. should be adjusted to appropriate levels for a theater, mobile device can generate and send wearable device the configuration data needed to adjust the wearable device's settings.

Figure 1:
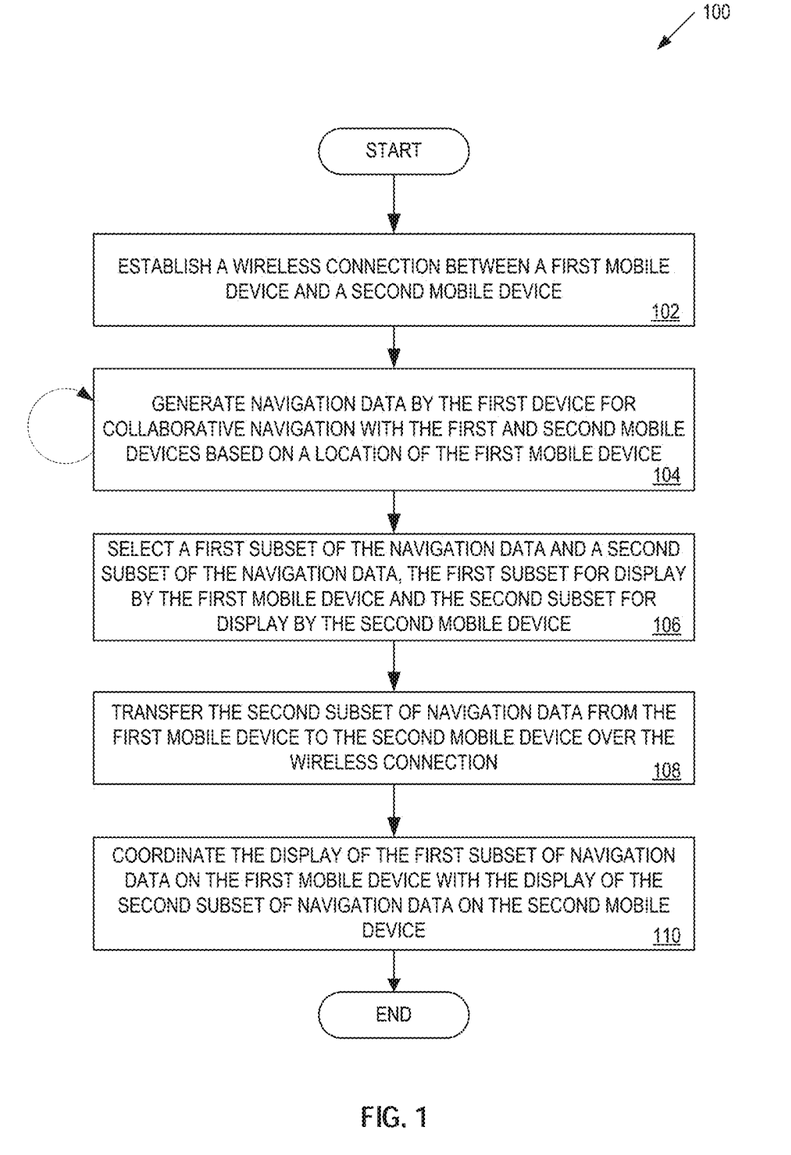
FIG. 1 is a flow diagram of one embodiment of a method for collaborative navigation with a first mobile device and a second mobile device.

FIG. 1 is a flow diagram of one embodiment of a method 100 for collaborative navigation with a first mobile device and a second mobile device. The method 100 is performed by processing logic that may comprise hardware (circuitry, dedicated logic, etc.), software (such as is run on a general purpose computer system or a dedicated machine), firmware, or a combination.

Referring to FIG. 1, processing logic begins by establishing a wireless connection between the first mobile device and the second mobile device (processing block 102). In one embodiment, the first mobile device may be a cellular telephone, and the second mobile device may be a wearable device. In one embodiment, the wireless connection is a Bluetooth network, Z-Wave network, ZigBee network, or other personal area network where the first mobile device and the second mobile device can exchange data with one another when in proximity of one another. In one embodiment, during establishment of the wireless connection, the first mobile device and the second mobile device may exchange configuration data, such as personal area network configuration parameters, wearable device operating capabilities, mobile device operating capabilities, user preference data, as well as other data. In one embodiment, by establishing the wireless connection, processing logic can infer that the mobile device and the wearable device are collocated. Because processing logic is able to infer that the first mobile device and the second mobile device are collocated, processing logic can assume that the location-based navigational data generated by the first mobile device, as discussed below, is relevant and accurate for the second mobile device.

Processing logic then generates navigation data by the first mobile device for collaborative navigation with the first and second mobile devices based on a location of the first mobile device (processing block 104). In one embodiment, processing logic performs real-time navigation data generation and processing on the first mobile device to generate a set of navigation data based on a location of the first mobile device. In one embodiment, the first mobile device may be more computationally powerful than the second mobile device. That is, due to the second mobile device's form factor, operational constraints, etc., the first mobile device may have greater processing resources, greater memory resources, greater power/battery resources, and additional functionality, such as real-time global positioning or access point navigation services. In one embodiment, the additional resources are utilized by the first mobile device to perform one or more navigation processes, such as generating real-time directions, generating real-time map-based navigation, location based search, as well as other navigation processes. In one embodiment, processing logic continues to perform the generation of navigation data at the first mobile device for real-time updates to the navigation process, such as updating a map display to reflect a current real-world position of the first mobile device, generating a status update for a user based on the navigation process, notifying a user that input is required within the navigation process, etc.

Processing logic selects a first subset of the navigation data and second set of the navigation data generated by the navigation process, where the first subset is for display by the first mobile device and the second subset is for display by the second mobile device (processing block 106). Processing logic then transfers the subset to the wearable device over the personal area network (processing block 108). In one embodiment, the subsets of navigation data may include different subsets selected based on one or more user preferences, based on capabilities of the wearable device, based on a request of a user, and as otherwise selected by the first or second mobile devices. In one embodiment, the subset of navigation data selected for, and transferred to, the second mobile device may include a different portion of navigation data, than the navigation data to be displayed by the first mobile device. In another embodiment, the subsets of navigation data may include different types of navigation data, such as navigation data generated from different types of positioning techniques (e.g., GPS-based navigation data, access point-based navigation data, cellular communication system-based navigation data, etc.).

After the navigation data is transferred to the wearable device, processing logic coordinates the display of the first subset of navigation data on the first mobile device with the display of the second subset of navigation data on the second mobile device (processing block 110). In one embodiment, processing logic displays different navigation data on the first mobile device and the second mobile device in real-time during the navigation process. In one embodiment, the display of the navigation data is coordinated so that the first mobile device and the second mobile device display the different navigation data, and updates to their respective sets of navigation data, simultaneously and in real time. For example, a mobile device within a shopping mall may display turn-by-turn navigation data on a floor map of the shopping mall, while a wearable device displays one or more of an upcoming turn direction, time to destination, user speed, current direction of travel, as well as other metrics.

Figure 2:
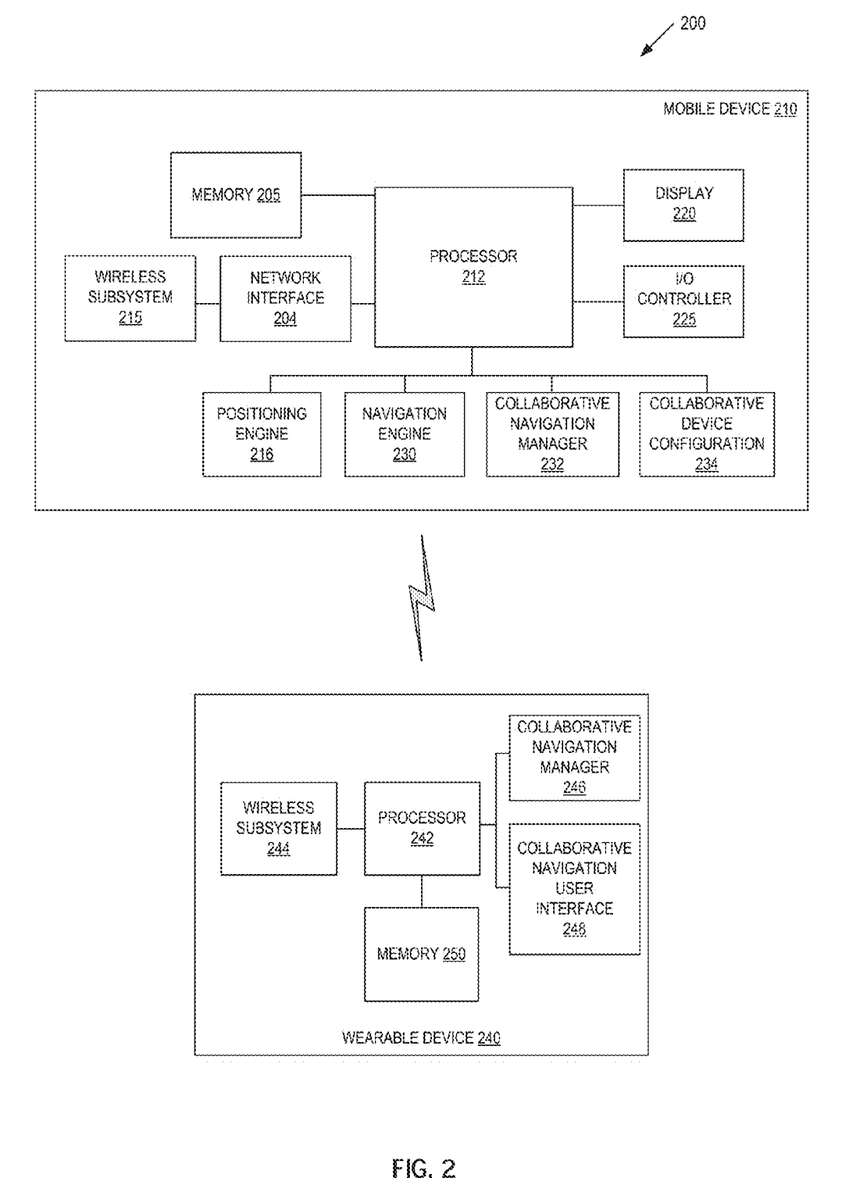
FIG. 2 is block diagram of one embodiment of a mobile device and a wearable device.

FIG. 2 is block diagram of one embodiment 200 of a mobile device 210 and a wearable device 240. In one embodiment, the mobile device 210 and wearable device 240 provide additional details for the first mobile device and the second mobile device discussed above in FIG. 1.

In one embodiment, mobile device 210 is a system such as a mobile telephone, tablet computer, etc., which may include one or more processors 212, a memory 205, I/O controller 225, positioning engine 216, network interface 204, and display 220. Mobile device 210 may also include a number of processing modules, which may be implemented as hardware, software, firmware, or a combination, such as navigation engine 230, collaborative navigation manager 232, and collaborative device configuration 234. It should be appreciated that mobile device 210 may also include, although not illustrated, a user interface (e.g., keyboard, touch-screen, or similar devices), a power device (e.g., a battery), as well as other components typically associated with electronic devices. Network interface 204 may also be coupled to a number of wireless subsystems 215 (e.g., Bluetooth, WiFi, Cellular, or other networks) to transmit and receive data streams through a wireless link. In one embodiment, wireless subsystem 215 communicatively couples mobile device 210 to wearable device.

In one embodiment, wearable device 240 is also a system such as a smartwatch, which may include one or more processors 242, a memory 250, and wireless subsystem 244. Wearable device 240 may also include a number of processing modules, which may be implemented as hardware, software, firmware, or a combination, such as collaborative navigation manager 246 and collaborative navigation graphical user interface 248. It should be appreciated that wearable device 240 may also include, although not illustrated, a user interface (e.g., keyboard, touch-screen, or similar devices), a power device (e.g., a battery), a display screen (e.g., an LCD display), as well as other components typically associated with electronic devices. Wireless subsystems 244 (e.g., Bluetooth, WiFi, Cellular, or other wireless subsystem) transmit and receive data streams through a wireless link to/from mobile device 210.

In one embodiment, one or both of memory 205 and memory 250 may be coupled to processors to store instructions for execution by the processors, such as processor 212 and processor 242. In some embodiments, memory 205 is non-transitory. Memory 205 may store one or more collaborative navigation modules (i.e., navigation engine 230, collaborative navigation manager, and/or collaborative device configuration 234), and memory 250 may also store one or more collaborative navigation modules (i.e., collaborative navigation manager 246 and/or collaborative navigation graphical user interface 248), to implement embodiments described herein. It should be appreciated that the embodiments as will be hereinafter described may be implemented through the execution of instructions, for example as stored in memory or other element, by processor 212 of mobile device 210, and/or other circuitry of mobile device 210, by processor 242 of wearable device 240, and/or other devices. Particularly, circuitry of mobile device 210 and wearable device 240, including but not limited to processor 212 and processor 242, may operate under the control of a program, routine, or the execution of instructions to execute methods or processes in accordance with the aspects and features described herein. For example, such a program may be implemented in firmware or software (e.g. stored in memory 205 and/or memory 250) and may be implemented by processors, such as processor 212 and/or processor 242, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, mobile device 210 and wearable device 240 are paired with one another over a wireless connection, such as a personal area network, via wireless subsystems 215 and 244. In one embodiment, collaborative navigation manager 232 initiates collaborative navigation between the wearable device 240 and the mobile device 210 using the wireless connection. As discussed herein, the collaborative navigation of wearable device 240 and mobile device 210 include the coordinated and real-time display of navigation data on each device.

In one embodiment, navigation engine of the mobile device 230 receives a user request to perform a navigation process. For example, a user may request a location based navigation service, such as a search for restaurants near the user's current location. As another example, the user may request real-time location based directions.

In response to the request to perform the navigation process, positioning engine 216 of mobile device 210 collects positioning data for navigation engine 230 to determine the mobile device's 210 location and perform one or more navigation processes based on the mobile device's 210 location. In one embodiment, the positioning engine 216 can include one or more positioning engines to apply different positioning techniques for determining mobile device's 210 location. For example, the positioning engine 216 may include Global Navigation Satellite System (GNSS) receivers to receive GNSS signal data, such as Global Positioning System (GPS), Galileo, Glonass or Compass data, from GNSS satellites. Based on distance, timing, and other data within the received GNSS signal data, an electronic device's position may be calculated. Since the GNSS signal data may not be available in certain indoor environments, in one embodiment, positioning engine 216 is further configured to receive data from WI-FI APs (not shown) for navigation engine 230 to determine mobile-device's 210 indoor position. In one embodiment, positioning engine 216 can collect data for both the mobile device's outdoor and indoor positions, for navigation engine 230 to simultaneously determine the mobile device's indoor and outdoor locations. Other positioning techniques, such as cellular network positioning techniques, LTE signal positioning techniques, WiFi access point positioning techniques, CDMA positioning techniques, etc. may be utilized in accordance with the discussion herein.

The techniques presented herein are not restricted to the use of GNNSS data, such as GPS, Galileo, Glonass or Compass data, for satellite-based positioning. For example, the techniques provided herein may be applied to or otherwise used in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise used with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

In one embodiment, collaborative navigation manager 232 observes the user request to perform the navigation process, or receives notice of the request from navigation engine 230, and initiates collaborative navigation. In one embodiment, navigation engine 230 generates navigation data for the navigation process, such as real-time maps, navigation breadcrumbs, a position fix, location based search results, etc.

Collaborative navigation manager 232 then determines which navigation data should be displayed by the mobile device 210, and which navigation data should be transferred to the wearable device 240. In one embodiment, collaborative navigation manager 232 decides which device is to display which navigation data based on a set of display defaults. In another embodiment, collaborative navigation manager 232 can receive user specification of navigation display modes, such as display of the same navigation data on both the mobile device 210 and the wearable device 240, display of navigation data on only the wearable device 240, display of navigation data on only the mobile device 210, display of particular types of navigation data on each device, selection of navigation metrics to display on the wearable device, selection of types of navigation data, such as GNSS or access point based navigation data, to be displayed on each device, as well as other user selectable display options.

Collaborative navigation manager 232 then transfer the selected navigation data to the wearable device 240 via the established wireless connection. Collaborative navigation manager 246 of the wearable device 240 receives the navigation data and generates display data for the collaborative navigation user interface 248. Collaborative navigation user interface 248 then presents the navigation data to the user on a display of the wearable device, or via other user interface options (such as vibration feedback, sounds, etc.).

As discussed herein, the navigation data that is transferred from mobile device 210 to wearable device 240, and then presented to a user on one or both of mobile device 210 and wearable device 240, may include different subsets and/or different types of navigation data. Furthermore the display of navigation data by each device occurs concurrently, and in real-time or near real-time, while the mobile device's position is changing.

In one embodiment, due to changes in the mobile device's 210 position during a navigation process, navigation engine 230 may detect conditions that trigger user feedback requests. For example, when a user strays from an initial route, navigation engine 230 may request confirmation that the user is still traveling to the original destination. As another example, when a user performs a location based search for a popular restaurant chain with multiple locations, navigation engine 230 may request a selection among located restaurants. In one embodiment, collaborative navigation engine 232 transfers the request for user feedback to wearable device 240.

Wearable device 240 receives the request for feedback, and the user selectable feedback options, and displays the request to the user in collaborative navigation user interface 248. A response to the feedback request is received and transferred back to the mobile device by collaborative navigation manager 246. In response to the user's feedback, navigation engine 230 updates the navigation process accordingly.

In one embodiment, user feedback/input may also be supplied from wearable device 240 to mobile device 210 at the initiation of a user of the wearable device 240. For example, a user can alter a navigation process by selecting one more user interface elements of the wearable device 240. As another example, a user may input data into a location based search, to be performed by mobile device 210, at the wearable device 240.

In one embodiment, the collaborative navigation performed by collaborative navigation manager 232 may be context sensitive based on one or more of a context associated with a user's current location, a context associated with a location based search, a context associated with a final destination in real-time directions, etc. For example, a collaborative navigation process may include providing a user with turn-by-turn walking directions to a movie theater. Because the movie theater is a special purpose location, a context that identifies device configuration parameters can be associated with the destination.

In one embodiment, collaborative device configuration 234 determines one or more location-based contexts within a navigation process. For example, collaborative device configuration 234 determines a context associated with a user's current location, a context associated with a destination of a travel route, etc. In one embodiment, collaborative device configuration 234 generates one or more configuration parameter requests to configure settings of the wearable device 240 based on the determined context associated with the navigation process and the mobile device's 210 determined location. The configuration parameters are then transferred from mobile device 210 to wearable device 240. Collaborative navigation manager 246 adjusts one or more settings of the wearable device 240 based on the received configuration parameters. Continuing the example of the navigation process to a movie theater, collaborative device configuration 234 may determine that a context associated with movie theatres indicates that device display brightness should be reduced to a certain level, and device volume turned off. Collaborative device configuration 234 could instruct wearable device 240 to adjust its settings according to the context associated with the mobile device's location within an ongoing navigation process.

Figure 3:
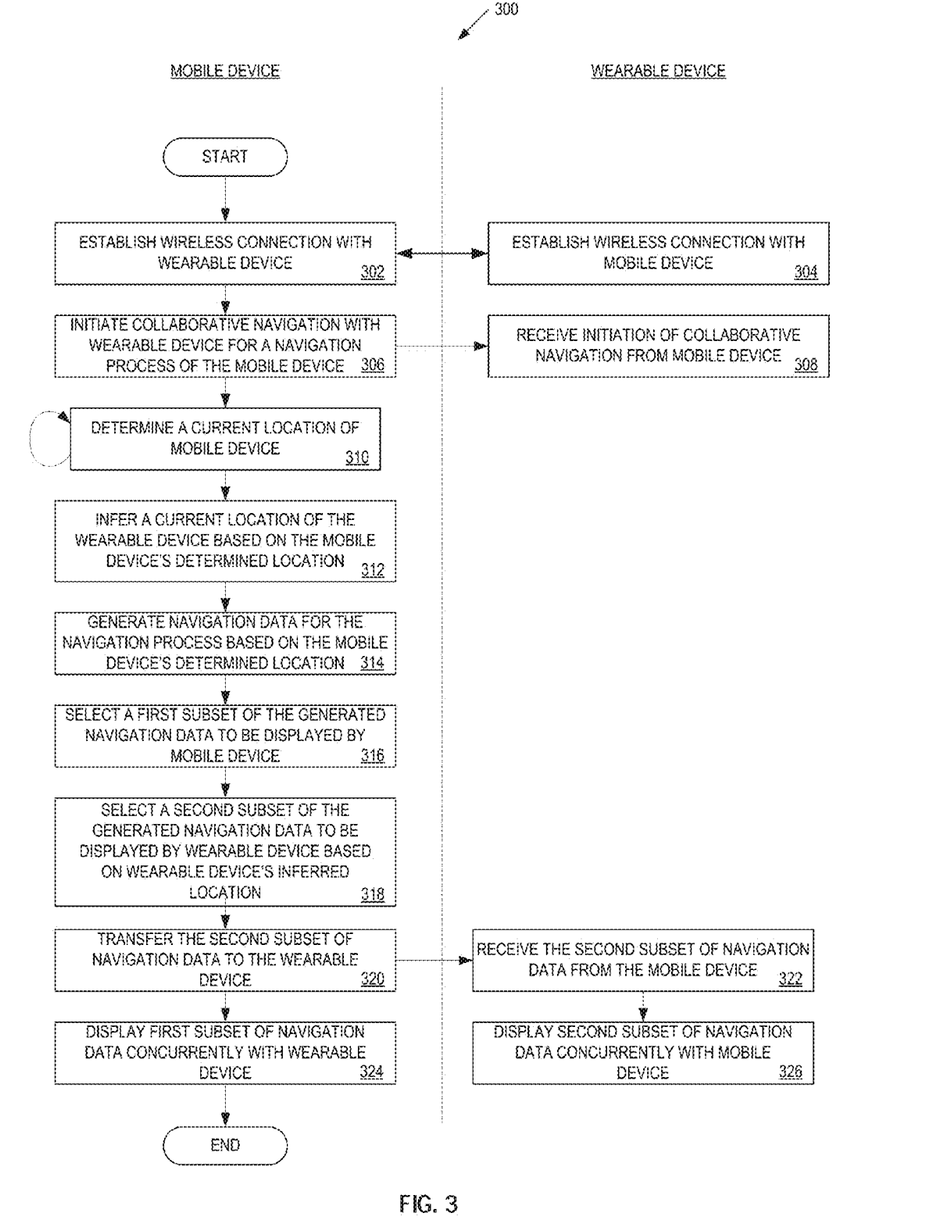
FIG. 3 is a flow diagram of one embodiment of a method for exchanging selected navigation data between a mobile device and a wearable device for concurrent display of different navigation data on different devices within a collaborative navigation process.

FIG. 3 is a flow diagram of one embodiment of a method 300 for exchanging selected navigation data between a mobile device and a wearable device for concurrent display of different navigation data on different devices within a collaborative navigation process. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (e.g., mobile device 210) and a wearable device (e.g., wearable device 240).

Referring to FIG. 3, processing logic begins with mobile device and wearable device establishing a wireless connection (processing blocks 302 and 304). In one embodiment, the establishment of the wireless connection, such as a personal area network, includes the exchange of network configuration data, device authentication data, device configuration data, as well as the exchange of additional data needed to establish the network between the mobile device and the wearable device.

Processing logic of the mobile device then initiates collaborative navigation with the wearable device for a navigation process of the mobile device (processing block 306). In one embodiment, the navigation process is a real-time and/or location based navigation process performed by processing logic based on the mobile device's location. Wearable device receives notification that collaborative navigation has been initiated (processing block 308). In one embodiment, and in response to the notification, wearable device waits for collaborative navigation data to display to a user in a user interface of the wearable device.

Processing logic of the mobile device determines a current location of the mobile device (processing block 310). In one embodiment, the location determination includes utilizing GNSS satellite signals and access point location data to determine the mobile device's location. In one embodiment, processing logic determines mobile device's location inside of a physical structure using the access point location determination.

From the determined current location of the mobile device, processing logic infers a current location of the wearable device (processing block 312). As discussed herein, establishment and maintenance of the wireless connection between the mobile device and the wearable device is used by processing logic to determine that the devices are collocated. Because the devices are collocated, the position of the mobile device provides sufficient accuracy for a position of the wearable device. Therefore, in one embodiment, wearable device does not perform location determination functions, but instead relies on the location inferred from the mobile device's location.

Processing logic generates navigation data for the navigation process based on the mobile device's determined location (processing block 314). In one embodiment, the navigation data can include a plurality of different navigation features, such as maps, mobile device's current location on the map, a floor plan of a structure, a mobile devices location on the floor plan, metrics associated with navigation (e.g., current speed, current direction, next turn, total distance, acceleration, etc.), as well as other navigation data.

Processing logic then selects a first subset of the navigation data to be displayed by the mobile device (processing block 316) and selects a second subset of the navigation data to be displayed by the wearable device based on the wearable device's inferred location (processing block 318). In one embodiment, processing logic performs the navigation data selection based on capabilities of the mobile device and wearable device, based on user preferences, based on user input, etc.

Processing logic transfers the second subset of navigation data to the wearable device (processing block 320) and then displays the first subset of navigation data (processing block 324). Processing logic of the wearable device receives the navigation data from the mobile device (processing block 322) and displays the second subset of navigation data concurrently with the mobile device's navigation data display (processing block 326).

In one embodiment, the concurrent display of different subsets of navigation data is utilized by each device to display unique navigation data, such as complimentary but different navigation data, different types of navigation data, navigation data with different purposes, etc. Furthermore, although the display of navigation data is discussed herein, in one embodiment, the second subset of navigation data may trigger various kinds of feedback elements, such as vibration of the wearable device, display of data by the wearable device, and sounds of the wearable device.

Figure 4:
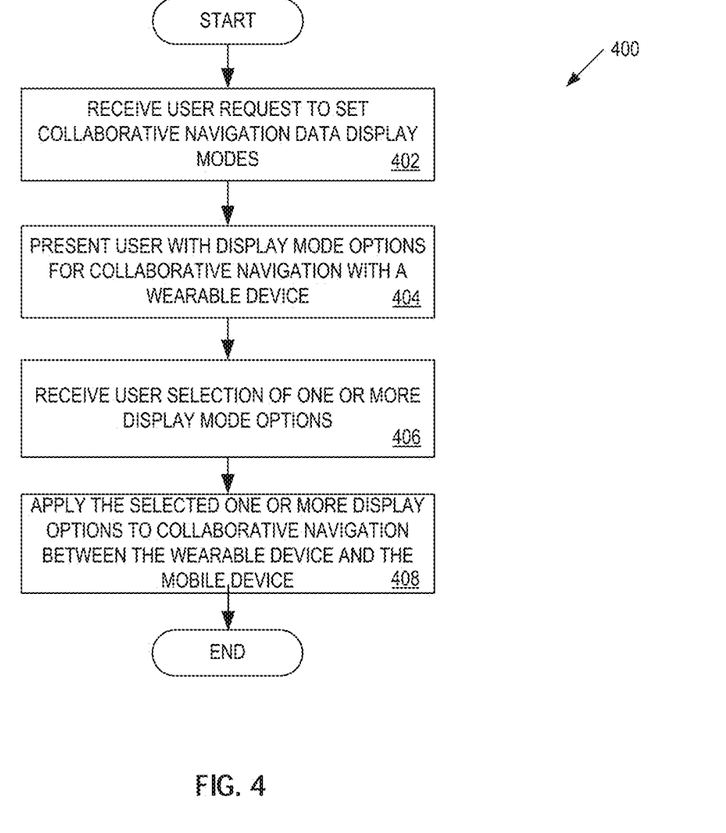
FIG. 4 is a flow diagram of one embodiment of a method for setting display mode options for collaborative navigation.

As discussed herein, there are several possibilities for the selection and rendering of collaborative navigation data on a mobile device and a wearable device. FIG. 4 is a flow diagram of one embodiment of a method 400 for setting display mode options for collaborative navigation. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., mobile device 210). However, in an alternative embodiment, the method may also be performed by a wearable device (e.g., wearable device 240).

Referring to FIG. 4, processing logic begins by receiving a user request to set collaborative navigation data display modes (processing block 402). Processing logic then presents the user with one or more display mode options for collaborative navigation with a wearable device (processing block 404). In one embodiment, and as discussed herein, the display modes define which devices are to display which data. For example, different display modes provide options for user selection between display of navigation data on only a single device, display of the same navigation data on both devices, display of different navigation data on different devices, etc.

Processing logic receives user selection of one or more the display mode options (processing block 406), and applies the selected display mode settings to collaborative navigation between the wearable device and the mobile device (processing block 408).

Figure 5:
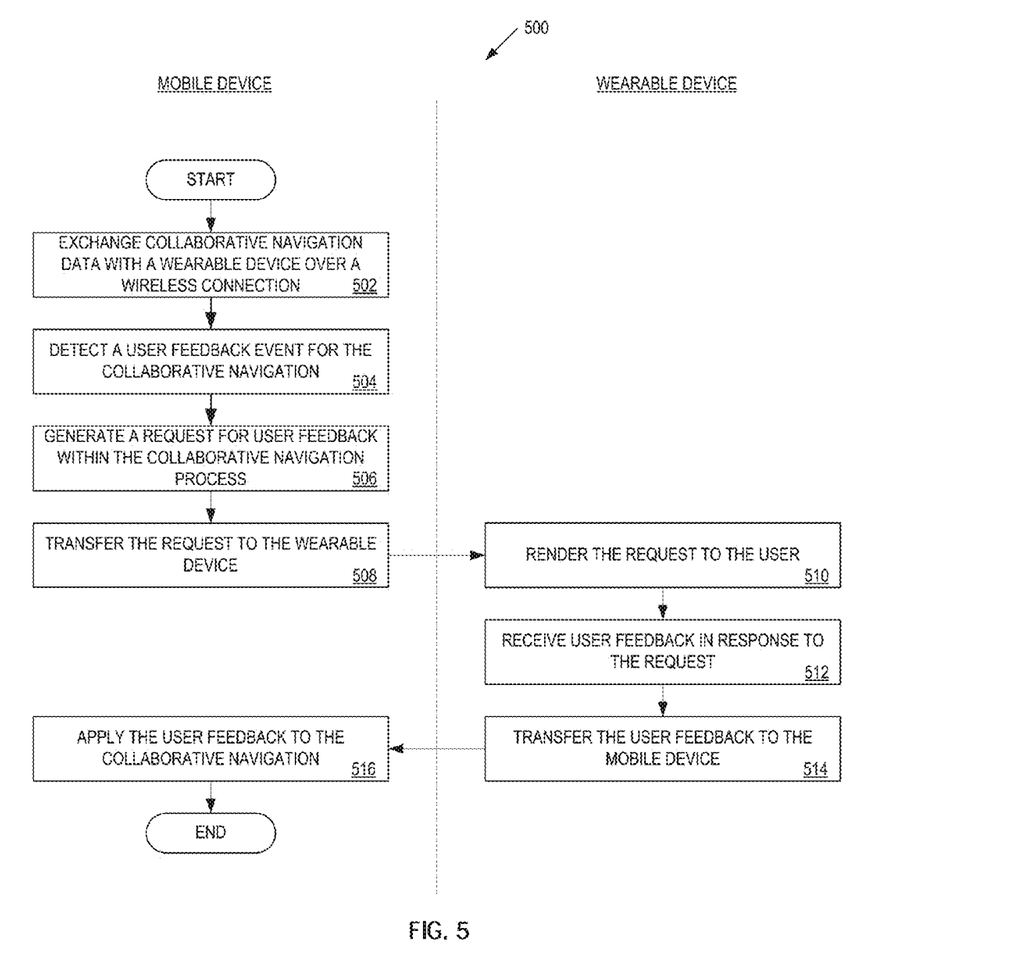
FIG. 5 is a flow diagram of one embodiment of a method for obtaining navigation process feedback from a wearable device during collaborative navigation.

FIG. 5 is a flow diagram of one embodiment of a method 500 for obtaining navigation process feedback from a wearable device during collaborative navigation. The method 500 is performed by processing logic that may comprise hardware (circuitry, dedicated logic, etc.), software (such as is run on a general purpose computer system or a dedicated machine), firmware, or a combination. In one embodiment, the method 500 is performed by a mobile device (e.g., mobile device 210) and a wearable device (e.g., wearable device 240).

Referring to FIG. 5, processing logic of the mobile device begins by exchanging collaborative navigation data with a wearable device over a personal are network (processing block 502). In one embodiment, the collaborative navigation data is exchanged as discussed above in FIG. 3.

Processing logic then detects a user feedback event for the collaborative navigation (processing block 504). In one embodiment, a user feedback event includes events that require a selection by a user among options in a navigation process. For example, selection between alternate routes, selection between different destinations, selection to alter an ongoing process, etc. Processing logic generates the request for user feedback (processing block 506) and transfers the request to the wearable device (processing block 508).

Processing logic of the wearable device renders the request to the user (processing block 510). Processing logic then receives user feedback in response to the request, such as selection or specification of feedback options presented to the user (processing block 512). The user feedback selection(s) are then transferred back to the mobile device (processing block 514). Processing logic of the mobile device then applies the feedback to the ongoing collaborative navigation process (processing block 516).

In one embodiment, the user feedback event discussed above may be user initiated feedback, such as a user-initiated alternation of an ongoing navigation route. In either embodiment of utilizing user feedback, the user may enter the selection into an interface of the wearable device. However, the user may utilize other methods to enter the feedback, such as pointing the device so that a compass or other sensor of the wearable device provides the sensor data as the user inputted feedback.

Figure 6:
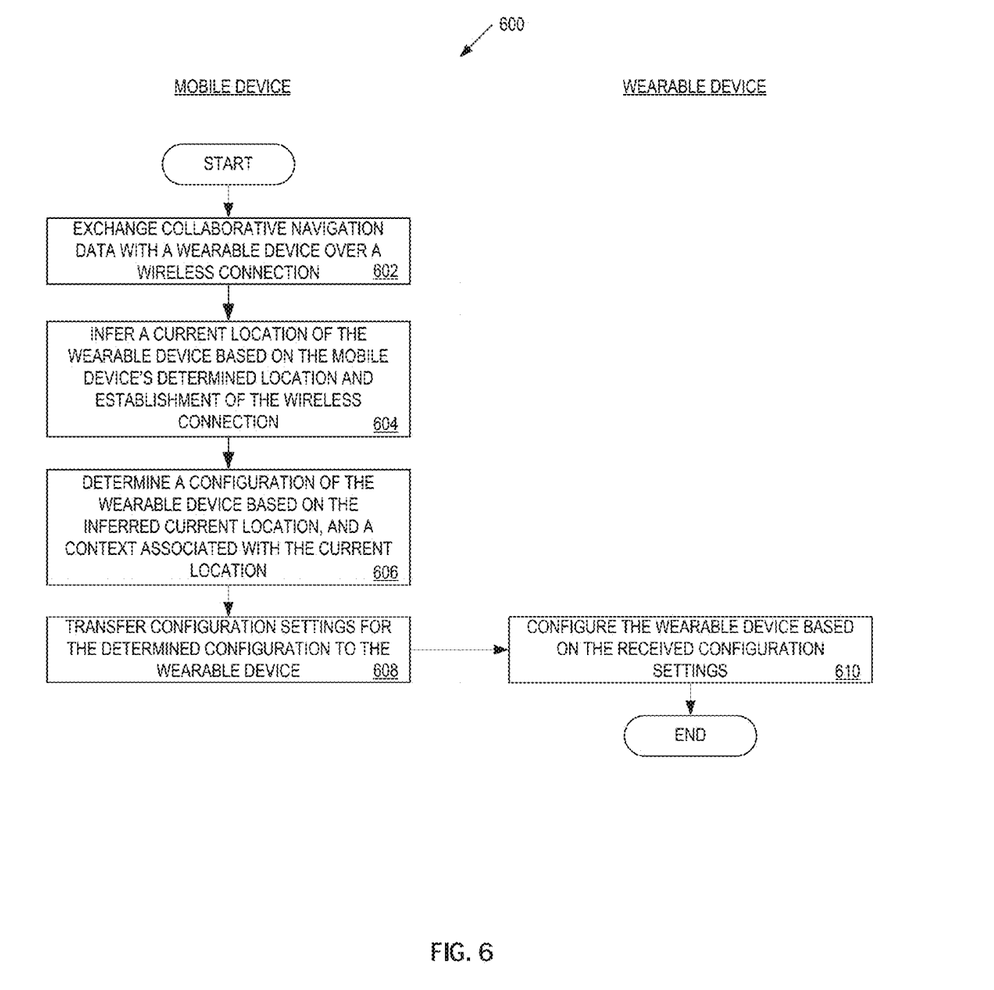
FIG. 6 is a flow diagram of one embodiment of a method for determining and setting a configuration of a wearable device during collaborative navigation.

FIG. 6 is a flow diagram of one embodiment of a method 600 for determining and setting a configuration of a wearable device during collaborative navigation. The method 600 is performed by processing logic that may comprise hardware (circuitry, dedicated logic, etc.), software (such as is run on a general purpose computer system or a dedicated machine), firmware, or a combination. In one embodiment, the method 600 is performed by a mobile device (e.g., mobile device 210) and a wearable device (e.g., wearable device 240).

Referring to FIG. 6, processing logic of the mobile device begins by exchanging collaborative navigation data with a wearable device over a personal are network (processing block 602). Processing logic then infers a current location of the wearable device based on the mobile device's determined location and establishment of the wireless connection (processing block 604). In one embodiment, the collaborative navigation data is exchanged, and the wearable device's location is inferred, as discussed above in FIG. 3.

Processing logic then determines a configuration of the wearable device based on the location of the wearable device inferred from a current location of the mobile device, and a context associated with the current location (processing block 606). In one embodiment, specific real world locations, such as movie theatres, churches, sporting events, etc. may be associated with device configuration parameters appropriate for their corresponding contexts. The contextual configuration parameters can be based on societal norms associated with those locations, such as turning volume off when inside a church, turning ringer off and reducing display brightness when inside a movie theatre, turning ringer up loud at a sporting event, etc. In one embodiment, the context sensitive device configuration is determined by processing logic accessing an assist data server, a context server, as well as other location-based context systems.

Processing logic of the mobile device transfers the configuration settings for the determined configuration to the wearable device (processing block 608). In one embodiment, the configuration settings may adjust one or more of the brightness, contrast, volume of the wearable device. In another embodiment, additional configuration settings, such as device time zones, how the time zone is determined, etc. may be adjusted. Processing logic of the wearable device receives the wearable device configuration parameters and configures the wearable device based on the received values (processing block 610).

It should be appreciated that when the devices discussed herein are a mobile device and a wearable device, that each may communicate via one or more wireless communication links through a wireless network that are based on or otherwise support any suitable wireless communication technology. For example, in some aspects mobile device and/or wearable device may associate with a network including a wireless network. In some aspects the wireless connections discussed herein form networks, which may comprise a body area network, a personal area network (e.g., an ultra-wideband network), as well as other types of networks. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, wearable devices, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an Electrocardiography (EKG) device, etc.), or any other suitable device. These devices may have different power and data requirements and may result in different power profiles generated for each feature or set of features.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description is provided so that any person skilled in the art can make or use the embodiments described herein. Various modifications to these embodiments will be readily apparent to those skilled in the art, and the generic principles defined herein may be applied to other embodiments without departing from the spirit or scope of the described embodiments. Thus, the aspects and features described herein are not intended to be limited, but are to be accorded the widest scope consistent with the principles and novel features disclosed herein.

What is claimed is:

1. A method comprising:
    establishing a wireless communications link between a first mobile device and a second mobile device;
    generating navigation data by the first mobile device for a real-time navigation process performed by the first mobile device based on a position of the first mobile device;
    selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data;
    transferring the second subset of navigation data from the first mobile device to the second mobile device over the wireless communications link; and
    coordinating the presentation of the first subset of navigation data on the first mobile device with the presentation of the second subset of navigation data on the second mobile device, wherein coordinating the presentation of navigation data comprises coordinating presentation of a map by the first mobile device with presentation of one or more of an upcoming turn direction, a time to destination, a current speed, a current direction of travel, or a combination thereof by the second mobile device generated by the real-time navigation process.

2. The method of claim 1, wherein the first mobile device comprises a mobile telephone and the second mobile device comprises a wearable device.

3. The method of claim 2, wherein the wearable device is a smartwatch.

4. The method of claim 1, wherein the map is a point-to-point route for the user generated for the real-time navigation process.

5. The method of claim 1, wherein establishing the wireless communications link comprises pairing the second mobile device with the first mobile device over a personal area network connection, and inferring, by the first mobile device, that the first mobile device and the second mobile device are collocated by establishment and maintenance of the personal area network connection.

6. The method of claim 5, further comprising:
    determining a context associated with a real world location based on the position of the first mobile device;
    determining a configuration of the second mobile device based on the inferred collocation of the second mobile device and the context associated with the real world location; and
    transferring one or more configuration settings to adjust a current configuration of the second mobile device based on the determined configuration.

7. The method of claim 1, wherein generating navigation data by the first mobile device and coordinating the presentation further comprises:
    continuing to perform the real-time navigation process by the first mobile device to generate real time updates to the navigation data; and
    presenting an updated first subset of navigation data on the first mobile device and presenting an updated second subset of navigation data on the second mobile device in real time based on the generated updates to the navigation data.

8. The method of claim 1, further comprise:
    receiving, by the first mobile device, a user request to perform the navigation process, wherein the user request comprises a user requested location based search, a user request for real-time location based directions, or a combination thereof;
    in response to the user request to perform the navigation process, the first mobile device collecting positioning data; and
    determining the position of the first mobile device based on the collected positioning data.

9. The method of claim 1, further comprising:
    setting one or more presentation options for the collaborative navigation, wherein the first subset of navigation data and the second subset of the navigation data are selected based on the setting of the presentation options, and wherein the settings for the one or more presentation options are received by user selection to set the one or more options of the user input, and wherein the user selection is received by the first mobile device, the second mobile device, or a combination thereof.

10. The method of claim 1, wherein the first subset of navigation data is selected for presentation by the first mobile device and the second subset of navigation data is selected for presentation by the second mobile device based on one or more selection criteria, wherein the selection criteria comprise one or more user preferences, one or more capabilities of the second mobile device to present navigation data, one or more default presentation options, a user input, or a combination thereof.

11. A mobile device comprising:
    a memory; and
    one or more processors coupled with the memory, wherein the one or more processors are configured to
        establish a wireless communications link between the mobile device and a second mobile device,
        generate navigation data by the mobile device for a real-time navigation process performed by the mobile device based on a position of the mobile device,
        select a first subset of the navigation data and a second subset of the navigation data for collaborative navigation between the mobile device and the second mobile device, wherein the first subset of navigation data is selected for presentation by the mobile device and the second subset of navigation data is selected for presentation by the second mobile device, and wherein the first subset of navigation data and the second subset of navigation data comprises different navigation data, transfer the second subset of navigation data from the mobile device to the second mobile device over the wireless communications link, and coordinate the presentation of the first subset of navigation data on the mobile device with the presentation of the second subset of navigation data on the second mobile device, wherein coordinating the presentation of navigation data comprises coordinating presentation of a map by the mobile device with presentation of one or more of an upcoming turn direction, a time to destination, a current speed, a current direction of travel, or a combination thereof by the second mobile device generated by the real-time navigation process.

12. The mobile device of claim 11, wherein the mobile device comprises a mobile telephone and the second mobile device comprises a wearable device.

13. The mobile device of claim 12, wherein the wearable device is a smartwatch.

14. The mobile device of claim 11, wherein the map is a point-to-point route for the user generated for the real-time navigation process.

15. The mobile device of claim 11, wherein the one or more processors configured to generate navigation data by the mobile device and coordinate the presentation further comprises the one or more processors configured to:

continue to perform the real-time navigation process by the first mobile device to generate real time updates to the navigation data, and present an updated first subset of navigation data on the first mobile device and presenting an updated second subset of navigation data on the second mobile device in real time based on the generated updates to the navigation data.

16. The mobile device of claim 11, further comprising the one or more processors configured to:

receive a user request to perform the navigation process, wherein the user request comprises a user requested location based search, a user request for real-time location based directions, or a combination thereof, in response to the user request to perform the navigation process, collect positioning data, and determine the position of the mobile device based on the collected positioning data.

17. The mobile device of claim 11, further comprising the one or more processors configured to:

set one or more presentation options for the collaborative navigation, wherein the first subset of navigation data and the second subset of the navigation data are selected based on the setting of the presentation options, and wherein the settings for the one or more presentation options are received by user selection to set the one or more options of the user input, and wherein the user selection is received by the mobile device, the second mobile device, or a combination thereof.

18. A non-transitory computer readable storage medium including instructions that, when executed by one or more processors, cause the one or more processors to perform a method comprising:

establishing a wireless communications link between a first mobile device and a second mobile device;

generating navigation data by the first mobile device for a real-time navigation process performed by the first mobile device based on a position of the first mobile device;

selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data;

transferring the second subset of navigation data from the first mobile device to the second mobile device over the wireless communications link; and coordinating the presentation of the first subset of navigation data on the first mobile device with the presentation of the second subset of navigation data on the second mobile device, wherein coordinating the presentation of navigation data comprises coordinating presentation of a map by the first mobile device with presentation of one or more of an upcoming turn direction, a time to destination, a current speed, a current direction of travel, or a combination thereof by the second mobile device generated by the real-time navigation process.

19. The non-transitory computer readable storage medium of claim 18, wherein the first mobile device comprises a mobile telephone and the second mobile device comprises a wearable device.

20. The non-transitory computer readable storage medium of claim 19, wherein the wearable device is a smartwatch.

21. The non-transitory computer readable storage medium of claim 18, wherein generating navigation data by the first mobile device and coordinating the presentation further comprises:

continuing to perform the real-time navigation process by the first mobile device to generate real time updates to the navigation data; and presenting an updated first subset of navigation data on the first mobile device and presenting an updated second subset of navigation data on the second mobile device in real time based on the generated updates to the navigation data.

22. A system, comprising:

means for establishing a wireless communications link between a first mobile device and a second mobile device;

means for generating navigation data by the first mobile device for a real-time navigation process performed by the first mobile device based on a position of the first mobile device;

means for selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data;

means for transferring the second subset of navigation data from the first mobile device to the second mobile device over the wireless communications link; and means for coordinating the presentation of the first subset of navigation data on the first mobile device with the presentation of the second subset of navigation data on the second mobile device, wherein coordinating the presentation of navigation data comprises coordinating presentation of a map by the first mobile device with presentation of one or more of an upcoming turn direction, a time to destination, a current speed, a current direction of travel, or a combination thereof by the second mobile device generated by the real-time navigation process.

23. The system of claim 22, wherein the first mobile device comprises a mobile telephone and the second mobile device comprises a wearable device.

24. The system of claim 23, wherein the wearable device is a smartwatch.

25. The system of claim 22, wherein the means for generating navigation data by the first mobile device and the means for coordinating the presentation further comprises:

means for continuing to perform the real-time navigation process by the first mobile device to generate real time updates to the navigation data; and means for presenting an updated first subset of navigation data on the first mobile device and presenting an updated second subset of navigation data on the second mobile device in real time based on the generated updates to the navigation data.

26. A method comprising:

establishing a wireless communications link between a first mobile device and a second mobile device;

generating navigation data by the first mobile device for a navigation process performed by the first mobile device based on a position of the first mobile device;

selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data;

transferring the second subset of navigation data from the first mobile device to the second mobile device over the wireless communications link; and coordinating the presentation of the first subset of navigation data on the first mobile device with the presentation of the second subset of navigation data on the second mobile device, wherein the second mobile device generates one or more of a visual, auditory, or sensory notification to the user based on the second subset of navigation during the navigation process.

27. The method of claim 26, wherein the one or more of the visual, auditory, or sensory notification generated by the second mobile device causes the second mobile device to vibrate in response to an upcoming event during the navigation process.

28. The method of claim 27, wherein the upcoming event is an upcoming turn in the navigation process.

29. The method of claim 26, wherein the one or more of the visual, auditory, or sensory notification generated by the second mobile device causes the second mobile device to generate a sound in response to the second subset of navigation data.

30. The method of claim 26, wherein the first mobile device comprises a mobile telephone and the second mobile device comprises a wearable device.

31. The method of claim 30, wherein the wearable device is a smartwatch.

32. A mobile device comprising:

a memory; and one or more processors coupled with the memory, wherein the one or more processors are configured to establish a wireless communications link between the mobile device and a second mobile device, generate navigation data by the mobile device for a navigation process performed by the mobile device based on a position of the mobile device, select a first subset of the navigation data and a second subset of the navigation data for collaborative navigation between the mobile device and the second mobile device, wherein the first subset of navigation data is selected for presentation by the mobile device and the second subset of navigation data is selected for presentation by the second mobile device, and wherein the first subset of navigation data and the second subset of navigation data comprises different navigation data, transfer the second subset of navigation data from the mobile device to the second mobile device over the wireless communications link, and coordinate the presentation of the first subset of navigation data on the mobile device with the presentation of the second subset of navigation data on the second mobile device, wherein the second mobile device generates one or more of a visual, auditory, or sensory notification to the user based on the second subset of navigation during the navigation process.

33. The mobile device of claim 32, wherein the one or more of the visual, auditory, or sensory notification generated by the second mobile device causes the second mobile device to vibrate in response to an upcoming event during the navigation process.

34. The mobile device of claim 33, wherein the upcoming event is an upcoming turn in the navigation process.

35. The mobile device of claim 32, wherein the one or more of the visual, auditory, or sensory notification generated by the second mobile device causes the second mobile device to generate a sound in response to the second subset of navigation data.

36. The mobile device of claim 32, wherein the first mobile device comprises a mobile telephone and the second mobile device comprises a wearable device.

37. The mobile device of claim 36, wherein the wearable device is a smartwatch.

38. A non-transitory computer readable storage medium including instructions that, when executed by one or more processors, cause the one or more processors to perform a method comprising:

establishing a wireless communications link between a first mobile device and a second mobile device;

generating navigation data by the first mobile device for a navigation process performed by the first mobile device based on a position of the first mobile device;

selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data;

transferring the second subset of navigation data from the first mobile device to the second mobile device over the wireless communications link; and coordinating the presentation of the first subset of navigation data on the first mobile device with the presentation of the second subset of navigation data on the second mobile device, wherein the second mobile device generates one or more of a visual, auditory, or sensory notification to the user based on the second subset of navigation during the navigation process.

39. The non-transitory computer readable storage medium of claim 38, wherein the one or more of the visual, auditory, or sensory notification generated by the second mobile device causes the second mobile device to vibrate in response to an upcoming event during the navigation process.

40. The non-transitory computer readable storage medium of claim 39, wherein the upcoming event is an upcoming turn in the navigation process.

41. The non-transitory computer readable storage medium of claim 38, wherein the one or more of the visual, auditory, or sensory notification generated by the second mobile device causes the second mobile device to generate a sound in response to the second subset of navigation data.

42. The non-transitory computer readable storage medium of claim 38, wherein the first mobile device comprises a mobile telephone and the second mobile device comprises a wearable device.

43. The non-transitory computer readable storage medium of claim 42, wherein the wearable device is a smartwatch.

44. A system, comprising:
means for establishing a wireless communications link between a first mobile device and a second mobile device;
means for generating navigation data by the first mobile device for a navigation process performed by the first mobile device based on a position of the first mobile device;
means for selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data;
means for transferring the second subset of navigation data from the first mobile device to the second mobile device over the wireless communications link; and
means for coordinating the presentation of the first subset of navigation data on the first mobile device with the presentation of the second subset of navigation data on the second mobile device, wherein the second mobile device generates one or more of a visual, auditory, or sensory notification to the user based on the second subset of navigation during the navigation process.

45. The system of claim 44, wherein the one or more of the visual, auditory, or sensory notification generated by the second mobile device causes the second mobile device to vibrate in response to an upcoming event during the navigation process.

46. The system of claim 45, wherein the upcoming event is an upcoming turn in the navigation process.

47. The system of claim 44, wherein the one or more of the visual, auditory, or sensory notification generated by the second mobile device causes the second mobile device to generate a sound in response to the second subset of navigation data.

48. The system of claim 44, wherein the first mobile device comprises a mobile telephone and the second mobile device comprises a wearable device.

49. The system of claim 48, wherein the wearable device is a smartwatch.

50. A method, comprising:
establishing a wireless communications link between a first mobile device and a second mobile device;
generating navigation data by the first mobile device for a navigation process performed by the first mobile device based on a position of the first mobile device;
selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data, and wherein the first subset of the navigation data comprises a first type of navigation data generated by a first positioning technique, and wherein the second subset of navigation data comprises a second type of navigation data generated by a second positioning technique;
transferring the second subset of navigation data from the first mobile device to the second mobile device over the wireless communications link; and
coordinating the presentation of the first subset of navigation data generated by the first positioning technique on the first mobile device with the presentation of the second subset of navigation data generated by the second positioning technique on the second mobile device.

51. The method of claim 50, wherein the first type of positioning technique is a global positioning system (GPS) positioning process, and wherein the second type of positioning technique is an access point positioning process.

52. The method of claim 51, wherein the first type of navigation data presented by the first mobile device comprises a GPS based map showing a geography of a region, and wherein the second type of navigation data presented by the second mobile device comprises a location of the user on a map of an internal floor plan of a building.

53. The method of claim 50, wherein the first mobile device comprises a mobile telephone and the second mobile device comprises a wearable device.

54. The method of claim 53, wherein the wearable device is a smartwatch.

55. A mobile device, comprising:
a memory; and
one or more processors coupled with the memory, wherein the one or more processors are configured to establish a wireless communications link between the mobile device and a second mobile device, generate navigation data by the mobile device for a navigation process performed by the mobile device based on a position of the mobile device, select a first subset of the navigation data and a second subset of the navigation data for collaborative navigation between the mobile device and the second mobile device, wherein the first subset of navigation data is selected for presentation by the mobile device and the second subset of navigation data is selected for presentation by the second mobile device, and wherein the first subset of navigation data and the second subset of navigation data comprises different navigation data, and wherein the first subset of the navigation data comprises a first type of navigation data generated by a first positioning technique, and wherein the second subset of navigation data comprises a second type of navigation data generated by a second positioning technique, transfer the second subset of navigation data from the mobile device to the second mobile device over the wireless communications link, and coordinate the presentation of the first subset of navigation data generated by the first positioning technique on the mobile device with the presentation of the second subset of navigation data generated by the second positioning technique on the second mobile device.

56. The mobile device of claim 55, wherein the first type of positioning technique is a global positioning system (GPS) positioning process, and wherein the second type of positioning technique is an access point positioning process.

57. The mobile device of claim 56, wherein the first type of navigation data presented by the first mobile device comprises a GPS based map showing a geography of a region, and wherein the second type of navigation data presented by the second mobile device comprises a location of the user on a map of an internal floor plan of a building.

58. The mobile device of claim 55, wherein the first mobile device comprises a mobile telephone and the second mobile device comprises a wearable device.

59. The mobile device of claim 58, wherein the wearable device is a smartwatch.

60. A non-transitory computer readable storage medium including instructions that, when executed by one or more processors, cause the one or more processors to perform a method comprising:

establishing a wireless communications link between a first mobile device and a second mobile device;

generating navigation data by the first mobile device for a navigation process performed by the first mobile device based on a position of the first mobile device;

selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data, and wherein the first subset of the navigation data comprises a first type of navigation data generated by a first positioning technique, and wherein the second subset of navigation data comprises a second type of navigation data generated by a second positioning technique;

transferring the second subset of navigation data from the first mobile device to the second mobile device over the wireless communications link; and coordinating the presentation of the first subset of navigation data generated by the first positioning technique on the first mobile device with the presentation of the second subset of navigation data generated by the second positioning technique on the second mobile device.

61. The non-transitory computer readable storage medium of claim 60, wherein the first type of positioning technique is a global positioning system (GPS) positioning process, and wherein the second type of positioning technique is an access point positioning process.

62. The non-transitory computer readable storage medium of claim 61, wherein the first type of navigation data presented by the first mobile device comprises a GPS based map showing a geography of a region, and wherein the second type of navigation data presented by the second mobile device comprises a location of the user on a map of an internal floor plan of a building.

63. The non-transitory computer readable storage medium of claim 60, wherein the first mobile device comprises a mobile telephone and the second mobile device comprises a wearable device.

64. The non-transitory computer readable storage medium of claim 63, wherein the wearable device is a smartwatch.

65. A system, comprising:

means for establishing a wireless communications link between a first mobile device and a second mobile device;

means for generating navigation data by the first mobile device for a navigation process performed by the first mobile device based on a position of the first mobile device;

means for selecting a first subset of the navigation data and a second subset of the navigation data for collaborative navigation between the first mobile device and the second mobile device, wherein the first subset of navigation data is selected for presentation by the first mobile device and the second subset of navigation data is selected for presentation by the second mobile device, and wherein the first subset of navigation data and the second subset of navigation data comprises different navigation data, and wherein the first subset of the navigation data comprises a first type of navigation data generated by a first positioning technique, and wherein the second subset of navigation data comprises a second type of navigation data generated by a second positioning technique;

means for transferring the second subset of navigation data from the first mobile device to the second mobile device over the wireless communications link; and means for coordinating the presentation of the first subset of navigation data generated by the first positioning technique on the first mobile device with the presentation of the second subset of navigation data generated by the second positioning technique on the second mobile device.

66. The system of claim 65, wherein the first type of positioning technique is a global positioning system (GPS) positioning process, and wherein the second type of positioning technique is an access point positioning process.

67. The system of claim 66, wherein the first type of navigation data presented by the first mobile device comprises a GPS based map showing a geography of a region, and wherein the second type of navigation data presented by the second mobile device comprises a location of the user on a map of an internal floor plan of a building.

68. The system of claim 65, wherein the first mobile device comprises a mobile telephone and the second mobile device comprises a wearable device.

69. The system of claim 68, wherein the wearable device is a smartwatch.

* * * * *